United States Patent
Byun et al.

(10) Patent No.: US 10,340,726 B2
(45) Date of Patent: Jul. 2, 2019

(54) METHOD AND POWER TRANSMITTER FOR CONTROLLING POWER TRANSMISSION

(71) Applicant: Samsung Electronics Co., Ltd., Gyeonggi-do (KR)

(72) Inventors: Kang-Ho Byun, Gyeonggi-do (KR); Se-Ho Park, Gyeonggi-do (KR); Hae-Young Jun, Seoul (KR); Hee-Won Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/824,383

(22) Filed: Nov. 28, 2017

(65) Prior Publication Data

US 2018/0159356 A1 Jun. 7, 2018

Related U.S. Application Data

(63) Continuation of application No. 13/896,931, filed on May 17, 2013, now Pat. No. 9,876,378.

(30) Foreign Application Priority Data

Jul. 10, 2012 (KR) .................. 10-2012-0075274
Jul. 30, 2012 (KR) .................. 10-2012-0083546

(51) Int. Cl.
*H02J 7/02* (2016.01)
*H02J 50/12* (2016.01)
(Continued)

(52) U.S. Cl.
CPC .............. *H02J 7/025* (2013.01); *H02J 50/12* (2016.02); *H02J 50/40* (2016.02); *H02J 50/80* (2016.02);
(Continued)

(58) Field of Classification Search
CPC .. H02J 7/025; H02J 50/80; H02J 50/12; H02J 50/40; H02J 50/10; H05K 999/99; Y02D 70/00; Y02B 70/30
See application file for complete search history.

(56) References Cited

U.S. PATENT DOCUMENTS

2007/0242647 A1 10/2007 Bennett
2009/0042525 A1 2/2009 Rajagopal et al.
(Continued)

FOREIGN PATENT DOCUMENTS

| CN | 101662171 | 3/2010 |
| JP | 11-110501 | 4/1999 |

(Continued)

OTHER PUBLICATIONS

European Search Report dated Apr. 7, 2016 issued in counterpart application No. 13816759.8-1804, 9 pages.
(Continued)

*Primary Examiner* — Robert L Deberadinis
(74) *Attorney, Agent, or Firm* — The Farrell Law Firm, P.C.

(57) ABSTRACT

Methods and apparatuses are provided for controlling power transmission in a power transmitter. A first message including a first voltage and a second voltage that is greater than the first voltage, is received from at least one power receiver. Power is transmitted to the at least one power receiver. A second message including a third voltage measured at the at least one power receiver during power transmission from the power transmitter, is received from the at least one power receiver. An amount of the power is adjusted based on whether the third voltage is between the first voltage and the second voltage. The first voltage is a minimum voltage for the at least one power receiver.

12 Claims, 7 Drawing Sheets

(51) Int. Cl.
*H02J 50/40* (2016.01)
*H02J 50/80* (2016.01)
*H02J 50/10* (2016.01)

(52) U.S. Cl.
CPC .......... *H05K 999/99* (2013.01); *H02J 50/10* (2016.02); *Y02B 70/30* (2013.01); *Y02D 70/00* (2018.01)

(56) References Cited

U.S. PATENT DOCUMENTS

| | | |
|---|---|---|
| 2009/0197802 A1 | 8/2009 | Dong |
| 2010/0056098 A1 | 3/2010 | Kanno et al. |
| 2010/0259109 A1 | 10/2010 | Sato |
| 2010/0308939 A1 | 12/2010 | Kurs |
| 2011/0074348 A1 | 3/2011 | Villa Gazulla et al. |
| 2011/0156491 A1 | 6/2011 | Kim et al. |
| 2011/0221388 A1 | 9/2011 | Low et al. |
| 2011/0260532 A1 | 10/2011 | Tanabe |
| 2012/0149307 A1 | 6/2012 | Terada et al. |
| 2012/0153903 A1 | 6/2012 | Kim et al. |
| 2013/0099585 A1 | 4/2013 | Von Novak et al. |

FOREIGN PATENT DOCUMENTS

| | | |
|---|---|---|
| JP | 2001-520855 | 10/2001 |
| JP | 2005-110412 | 4/2005 |
| JP | 2008-283790 | 11/2008 |
| JP | 2010-288442 | 12/2010 |
| JP | 2011-166931 | 8/2011 |
| JP | 2011-215703 | 10/2011 |
| KR | 1020080095642 | 10/2008 |
| KR | 1020110133242 | 12/2011 |
| WO | WO 2009/126963 | 10/2009 |
| WO | WO 2010/093965 | 8/2010 |
| WO | WO 2012/032385 | 3/2012 |

OTHER PUBLICATIONS

Chinese Office Action dated May 27, 2016 issued in counterpart application No. 201380036670.2, 9 pages.
Japanese Office Action dated Jun. 5, 2017 issued in counterpart application No. 2015-521534, 5 pages.
Japanese Office Action dated Dec. 4, 2017 issued in counterpart application No. 2015-521534, 10 pages.
U.S. Office Action dated Feb. 7, 2019 issued in counterpart application No. 16/199,943, 29 pages.

METHOD AND POWER TRANSMITTER FOR CONTROLLING POWER TRANSMISSION

PRIORITY

This application is a Continuation Application of U.S. patent application Ser. No. 13/896,931, filed in the U.S. Patent and Trademark Office on May 17, 2013, which claims priority under 35 U.S.C. § 119(a) to Korean Patent Applications filed in the Korean Intellectual Property Office on Jul. 10, 2012 and Jul. 30, 2012, and assigned Serial Nos. 10-2012-0075274 and 10-2012-0083546, respectively, the contents of which are incorporated herein by reference.

BACKGROUND OF THE INVENTION

1. Field of the Invention

The present invention relates generally to a wireless power transmission system, and more particularly, to a method for controlling power of a power transmission transmitter.

2. Description of the Related Art

Wireless and contactless charging technologies have recently been developed and applied to many different electronic devices. The wireless charging technology, which uses wireless power transmission and reception, enables, for example, a battery of a cell phone to be automatically charged by placing the cell phone on a charging pad. The wireless charging technology does not require a separate charging connector. The wireless charging technology wirelessly charges electronic products and eliminates the need for a wired charger, thereby contributing to an electronic product's ability to be waterproof and portable.

In resonance method based charging, when a power receiver in need of charging is located in a power transmitter for transmitting wireless power, the power transmitter may charge the power receiver. If a plurality of power receivers is placed in a charging area of a single power transmitter, the power demanded from each power receiver may be different from the transmission power of the single power transmitter. Thus, charging for each power receiver needs to be conducted efficiently.

A conventional power transmitter establishes a voltage reference for power control to efficiently supply power to the power receiver. However, charging efficiency may vary depending on various charging conditions, such as, for example, characteristics of the power receiver, hardware design, a distance between the power receiver and the power transmitter, a charging position, etc.

SUMMARY OF THE INVENTION

The present invention has been made to address at least the above problems and/or disadvantages and to provide at least the advantages described below. Accordingly, an aspect of the present invention provides an apparatus and method for conducting efficient power transmission in a power transmitter.

Another aspect of the present invention provides an apparatus and method for determining power demanded from a power receiver.

In accordance with an aspect of the present invention, a method is provided for controlling power transmission in a power transmitter. A first message including a first voltage and a second voltage that is greater than the first voltage, is received from at least one power receiver. Power is transmitted to the at least one power receiver. A second message including a third voltage measured at the at least one power receiver during power transmission from the power transmitter, is received from the at least one power receiver. An amount of the power is adjusted based on whether the third voltage is between the first voltage and the second voltage. The first voltage is a minimum voltage for the at least one power receiver.

In accordance with another aspect of the present invention, a power transmitter is provided for controlling power transmission. The power transmitter includes a resonator, a power supply, and a wireless communication unit. The wireless communication unit is configured to receive, from at least one power receiver, a first message including a first voltage and a second voltage that is greater than the first voltage. The wireless communication unit is also configured to receive, from the at least one power receiver, a second message including a third voltage measured at the at least one power receiver during power transmission from the power transmitter. The power transmitter also includes a controller configured to control the power supply to transmit the power to the at least one power receiver through the resonator. The controller is also configured to adjust an amount of the power based on whether the third voltage is between the first voltage and the second voltage, wherein the first voltage is a minimum voltage for the at least one power receiver.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
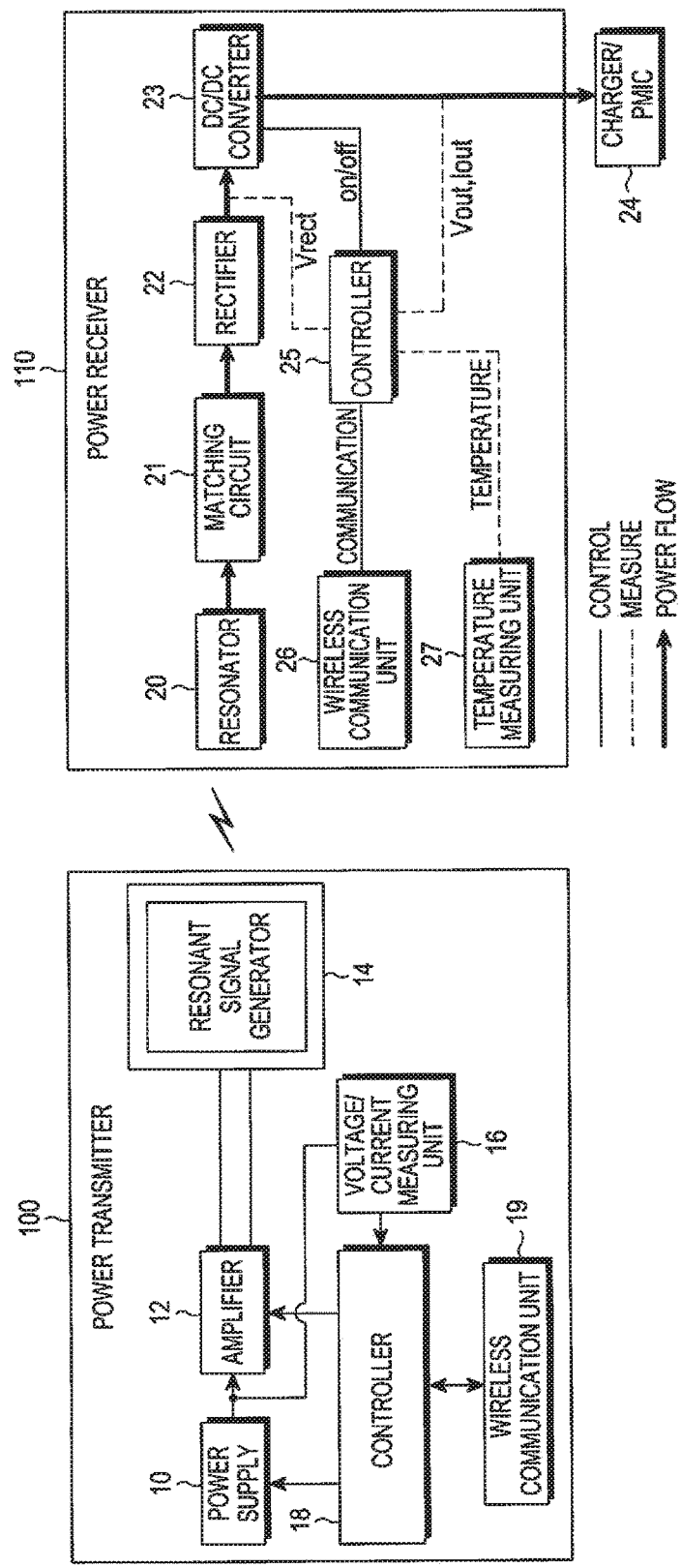
FIG. 1 is a block diagram illustrating a power transmitter and a power receiver, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Embodiments of the present invention propose a method of controlling efficient power transmission in a power transmitter. In an embodiment of the present invention, a power receiver notifies the power transmitter of minimum and maximum voltages that may be received at the power receiver, a reference voltage that acts as a reference for determining a region having good charging efficiency, and a demanded voltage at the power receiver. The power transmitter determines a best efficient voltage region having good efficiency based on the reference voltage, and adjusts the transmission power according to a power receiving condition received from the power receiver, which is being powered by the transmission power. Accordingly, efficient power control is accomplished by adaptively adjusting the transmission power based on the power receiving condition to guarantee the best charging efficiency in the power receiver.

The demanded voltage and the reference voltage are described in greater detail below. When the power receiver receives power from the power transmitter, there is an input voltage Vin having the best charging efficiency. However, in the power receiver, a desired optimum input voltage Vin having the best charging efficiency varies depending on various circumstances, such as, for example, hardware designs, charging conditions, temperatures, etc. Therefore, when power transmission is conducted using only the minimum and maximum voltages in the power transmitter, the transmission power is determined to be within a range between the minimum and maximum voltages. However, since the range between the minimum and maximum voltages is too wide to determine the transmission power therein, the charging efficiency in the power receiver may vary significantly within the range. Thus, if it is possible to determine a portion of the range between the minimum and maximum voltages having the best charging efficiency for the power receiver, more efficient power transmission would be accomplished.

Embodiments of the present invention propose a method of determining a range having the best charging efficiency from within the range between the minimum and maximum voltages. In the following description, a voltage to be used for determining the range having the best charging efficiency, i.e., a power reception efficiency greater than a certain efficiency, is defined as a reference voltage V_high, and an optimum input voltage Vin required by the power receiver is defined as a demanded voltage V_opt. Specifically, the reference voltage is a voltage that is used to divide the range between the minimum and maximum voltages into predetermined portions. A range between the reference voltage and the minimum voltage has a relatively high power reception efficiency when compared with other ranges.

A method of determining the reference voltage and the demanded voltage in the power receiver is described in greater detail with reference to FIG. 1. FIG. 1 is a block diagram illustrating a power transmitter 100 and a power receiver 110 constituting a wireless power transmission system, according to an embodiment of the present invention. In FIG. 1, the power transmitter 100 and the power receiver 110 are shown to be connected in one-to-one relationship, however, the wireless power transmission system of embodiments of the present invention may also include one or more power transmitters 100 and one or more power receivers 110. The power receiver may be embodied as, for example, a cell phone, a Personal Digital Assistant (PDA), a Moving Picture Experts Group (MPEG)-1 or MPEG-2 Audio Layer III (MP3) device, a laptop computer, a camera, or any kind of electronic device.

Referring to FIG. 1, the power transmitter 100 is configured to include a power supply 10 having, e.g., a Voltage Control Oscillator (VCO) for supplying power to generate a resonant frequency signal determined by a controller 18. The power transmitter 100 also includes an amplifier 12 for amplifying the signal generated by the power supply 10 according to the power supplied from the power supply 10. The power transmitter 100 additionally includes a resonant signal generator 14 for transmitting the power from the power supply 10 in a wireless resonant signal, according to the high-amplitude signal generated by the amplifier 12. The power transmitter 100 further includes a voltage/current measuring unit 16 for measuring the voltage and current generated by the power supply 10, and the controller 18 for controlling general wireless power transmission operations of the power transmitter 100. In particular, the controller 18 monitors a voltage and a current of the wirelessly transmitted resonant signal according to the voltage and current detected at the voltage/current measuring unit 16, and controls operations of the power supply 10 and amplifier 12 to maintain the voltage and current of the resonant signal to be in a preset normal range. The power transmitter 100 also includes a wireless communication unit 19 configured to employ one of a variety of wireless short range communication schemes, such as, for example, Bluetooth, to communicate with the power receiver 110 in relation to the operations of the wireless power transmission under control of the controller 18. The resonant signal generator 14 includes a charging substrate, on which to position the power receiver 110, in an upper part of the resonant signal generator 14.

The controller 18 of the power transmitter 100 may be configured with, e.g., a Micro Controller Unit (MCU), which controls the power transmission by determining a range having the best charging efficiency for each of one or more power receivers, as described in greater detail below.

The power receiver 110 includes a resonator 20 for receiving the wireless resonant signal transmitted from the resonant signal generator 14 of the power transmitter 100. The power receiver 110 also includes a rectifier 22 for rectifying the power received via a matching circuit 21 in an Alternate Current (AC) 21 to be in a Direct Current (DC) form. The power receiver 110 additionally includes a DC/DC converter 23 (also referred to as a constant voltage generator) for converting power outputted from the rectifier 22 into an operating power (e.g., +5V) demanded by, e.g., a portable terminal established with such a power receiver. The power receiver 110 further includes a charger/Power Management Integrated Circuit (PMIC) 24 for being charged with the operating power, and a controller 25 for measuring a voltage Vrect outputted from the rectifier 22, i.e., an input voltage Vin, an output voltage Vout, and an output current Iout from the DC/DC converter 23. The controller 25 may be configured with an MCU, and determines a power receiving condition based on the measured voltage/current information and provides information about the power receiving condition.

Specifically, the controller 25 of the power receiver 110 may change the reference voltage V_high, according to the voltage/current information measured by the controller 25. Specifically, the reference voltage V_high may be changed based on the input voltage Vin, the output voltage Vout, and the output current Iout. For example, the power receiver 110 determines the reference voltage V_high to be 7 V, and notifies the power transmitter 100 of the 7 V of the reference voltage V_high. If the output voltage Vout is measured to be 4 V during the charge, the power receiver 110 changes the reference voltage V_high to be 8 V. The reference voltage V_high is changed because the power receiver 110 determines that the current voltage output Vout is not enough for charging, since the power receiver 110 knows in advance that the output voltage Vout may be 5 v±5% in normal charging. If the reference voltage V_high is 7 V, and the output voltage Vout, the output current Iout, and the input voltage Vin are measured to be 5 V, 100 mA, and 6 V, respectively, the controller 25 of the power receiver 110 may determine that input power exceeds the power that is required for charging, and may change the reference voltage V_high to be 6 V. The controller 25 may also change the demanded voltage V_opt in addition to the reference voltage V_high.

The power receiver 110 further include a wireless communication unit 26 to communicate with the power transmitter 100 in relation to wireless power reception operations under control of the controller 25. The wireless communication unit 26 operates by adopting one of a variety of short range wireless communication schemes. The wireless communication unit 26 may transmit and receive various information and messages required in the wireless charging procedure through the short range wireless communication under control of the controller 25.

In an embodiment of the present invention, the wireless communication unit 19 of the power transmitter 100 receives, from at least one power receiver, minimum and maximum voltages that the power receiver may receive, the reference voltage used for dividing the range between the minimum and maximum voltages into predetermined portions, and the demanded voltage required by the power receiver, in a registration phase, under control of the controller 18. The wireless communication unit 19 of the power transmitter 100 also receives a report about the power receiving condition, including a measured voltage at the power receiver 110 during power transmission from the power transmitter 100. The controller 18 determines whether the measured voltage is within the range between the minimum voltage and the reference voltage. If the measured voltage is out of the range between the minimum voltage and the reference voltage, the controller 18 adjusts the transmission power.

When there is a plurality of power receivers in a charging area, in an embodiment of the present invention, the controller 18 receives minimum and maximum voltages and demanded voltages from the plurality of power receivers. The controller 18 receives the report about the charging condition from each power receiver after the power transmission. If it is determined that measured voltages of all the power receivers belong to best efficient voltage regions determined for the respective power receivers, the controller 18 determines which power receiver should be used as a base for controlling the power transmission. If any of the power receivers is selected, the power transmitter 100 adjusts the transmission power according to the demanded voltage of the selected power receiver. Methods of selecting any of the power receivers include at least one of a method of selecting a power receiver having a highest current reception power from among the plurality of power receivers, a method of selecting a power receiver having a highest maximum reception power from among the plurality of power receivers, and a method of selecting a power receiver having a highest power usage rate from among the plurality of power receivers. If it is determined that there are two or more power receivers having the high usage rates, the power transmitter 100 may control the power transmission according to the method of selecting the power receiver having the highest current reception power from among the two or more power receivers.

When there is a plurality of power receivers whose measured voltages belong to ranges between their respective minimum voltages and the respective reference voltages after the power transmission, the controller 18 determines a power control method. The power control methods include, for example, a method of adjusting power according to the demanded power of the power receiver selected from among the plurality of power receivers, and a method of increasing the entire efficiency for the plurality of power receivers.

In an embodiment of the present invention, the power receiver 110 further includes a temperature measuring unit 27 for measuring the temperature out of the rectifier 22 or for measuring a battery temperature. The controller 25 of the power receiver 110 may set up the reference voltage V_high and the demanded voltage V_opt based on information of the temperature measured by the controller 25. The reference voltage V_high is less than the maximum voltage V_max but greater than the demanded voltage V_opt. The demanded voltage V-opt is greater than the minimum voltage V_min but less than the reference voltage V_high. The reference voltage V_high and the demanded voltage V_opt may be set up by using values determined in advance in the power receiver 110 by taking into account a change in hardware design. For example, if the reference voltage V_high is 10 V, the demanded voltage V_opt may be set up as 7 V.

The reference voltage V_high and the demanded voltage V_opt are changed according to the measured temperature. Specifically, if the measured temperature reaches a specific temperature, the power receiver 110 may decrease the reference voltage V_high and the demanded voltage V_opt.

If the measured temperature is greater than the specific temperature, the reference voltage V_high is decreased to be less than an initial reference voltage V_high informed to the power transmitter 100. The extent of the decrease may be adjusted in proportion to a difference between a current temperature and the specific temperature. For example, if the initial reference voltage V_high is 10 V, the specific temperature is 45 degrees, the measured temperature is 50 degrees, and a method of dropping 1 V down for every 5-degree difference is employed, the reference voltage V_high becomes 9 V resulting from the subtraction of 1 V from the initial reference voltage V_high, 10 V. If the measured temperature is less than the specific temperature, the reference voltage V_high is increased to be greater than an initial reference voltage V_high. For example, if the specific temperature is 45 degrees, and the measured temperature is 30 degrees, the reference voltage V_high becomes 13 V resulting from the addition of 3V to the initial reference voltage V_high, 10V.

Similarly, if the measured temperature is greater than the specific temperature, the demanded voltage V_opt may be decreased to an extent that it becomes less than an initial demanded voltage V_opt. For example, if the initial demanded voltage V_opt is 7 V, the specific temperature is 45 degrees, the measured temperature is 50 degrees, and a method of decreasing 0.5 V for every 5-degree difference is employed, the changed demanded voltage V_opt becomes 6.5 V resulting from the subtraction of 0.5 V from 7 V. The initial reference voltage V_high and the initial demanded voltage V_opt refer to a reference voltage and a demanded voltage, respectively, notified to the power transmitter 100 in the registration phase.

If the reference voltage V_high and the demanded voltage V_opt become different from the initial/previous reference voltage V_high and the initial/previous demanded voltage V_opt, respectively, the power receiver 110 notifies the power transmitter 100 of the changed reference voltage V_high and the changed demanded voltage V_opt in a charging report. The changed reference voltage V_high and the changed demanded voltage V_opt may be periodically/non-periodically reported to the power transmitter 100.

However, if an increase in temperature for a specific period of time exceeds the specific temperature, the reference voltage V_high and the demanded voltage V_opt may be decreased. For example, if the reference voltage V_high is 7 V and the temperature increases by 5 degrees for 1 minute, then the reference voltage V_high may be decreased.

Accordingly, the power transmitter 100 may control the power based on information of the reference voltage V_high and demanded voltage V_opt of the power receiver 110, and periodically transmitted information of current temperature of the power receiver 110. Specifically, with the information, the power transmitter 100 may provide the power by determining that a charging efficiency is low for a power receiver whose temperature is relatively high, and determining the transmission power based on the reference voltage V_high of a power receiver whose temperature is high. In addition, if it is determined from the information of temperature received from the power receiver 110 that the power receiver 110 exceeds a predetermined temperature threshold, the power transmitter 100 may stop transmitting the power by transmitting a shut down message to the wireless communication unit 19 to cut off a load switch to the power receiver 110.

However, the power receiver 110 periodically or non-periodically sends the power transmitter 100 the reference voltage V_high and the demanded voltage V_opt determined in the manner described above. In the case of non-periodical transmission, the power receiver 110 may transmit the information non-periodically when the input voltage Vin demanded by the power receiver 110 is changed. On the contrary, in the case of periodic transmission, the power receiver 110 may periodically transmit the information by inserting the information about the reference voltage V_high and the demanded voltage V_opt to a report frame to be transmitted to the power transmitter 100.

Upon reception of the information about the reference voltage V_high and the demanded voltage V_opt from the power receiver 110, the power transmitter 100 may use the received information about the reference voltage V_high and the demanded voltage V_opt as power transmission control information. Specifically, establishing ranges of the input voltage, according to an embodiment of the present invention, is described in greater detail below with reference to FIG. 2.

Figure 2:
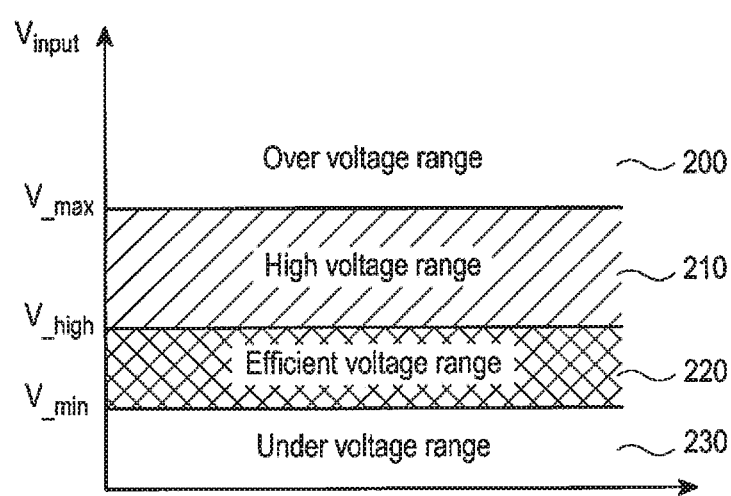
FIG. 2 is a graph illustrating setting ranges of input voltages, according to an embodiment of the present invention.

Referring to FIG. 2, the minimum voltage V_min indicates a voltage at which the charging is cut-off in the charging state, and indicates a voltage from which an under voltage may appear at an output (Vout) or at the PMIC 24 of the power receiver 110. The minimum voltage may be, e.g., 4.5 V.

The maximum voltage V_max indicates a voltage at which a circuitry on a power transmission line of the power receiver 110 may be damaged. The maximum voltage may be, e.g., 25 V.

When the range between the minimum voltage V_min and the maximum voltage V_max is 100, the reference voltage V_high indicates a voltage that divides the range into two ranges of certain percentages. Thus, the range between the minimum voltage V_min and the maximum voltage V_max is divided into a first voltage range between the minimum voltage V_min and the reference voltage V_high, and a second voltage range between the reference voltage V_high and the maximum voltage V_max. The first voltage range is defined as an efficient voltage range 220, having higher power reception efficiencies than a certain efficiency. The second voltage range is defined as a high voltage range 210, indicating that higher power than that required by the power receiver 110 is received. An over voltage range 200 is defined above the maximum voltage V_max, and an under voltage range 230 is defined below minimum voltage V_min.

For example, the reference voltage V_high, the reference for determining the best efficient voltage range, is calculated as set forth in Equation (1).

$$V\_high = V\_min + 0.3*(V\_max - V\_min) \quad (1)$$

In Equation (1), if the minimum voltage V_min is 4.5 V and the maximum voltage V_max is 25 V, the reference voltage V_high becomes 4.5+0.3*(25−4.5), i.e., 10.65 V. A size of each range may be dynamically changed according to a device efficiency, such as, for example, the efficiency of the resonator 20, Power Amplifier (PA) efficiency, the efficiency of the rectifier 22, Switched Mode Power Supply (SMPS) efficiency, etc.

Operations of the power receiver 110 are described in greater detail below with reference to FIG. 3. The power receiver 110 searches and pairs with the power transmitter 100, registers in the power transmitter 100, and starts being charged in a standby mode. After finishing the registration, the power transmitter 100 may know of the power demanded by the power receiver 110. In this regard, the power receiver 110 sends the power transmitter 100 a subscription request frame in the registration phase to subscribe to a wireless power network controlled by the power transmitter 100. The subscription request frame is represented below in Table 1.

TABLE 1

| Frame Type | Protocol Version | Sequence Number | Network ID | Product ID | Input Voltage Min | Input Voltage Max | Typical Output Voltage | Typical Output Current |
|---|---|---|---|---|---|---|---|---|
| Request Join | 4 bits | 1 byte | 1 byte | 4 bytes | 1 byte | 1 byte | 1 byte | 1 byte |

As shown in Table 1, the subscription request frame includes the minimum voltage V_min, the maximum voltage V_max, the output voltage Vout, the output current Iout, etc. The subscription request frame may further include the reference voltage V_high to be used a reference for determining a relatively better power reception efficiency range as compared with other ranges, and a demanded voltage V_opt required by the power receiver 110, according to an embodiment of the present invention.

Figure 5:
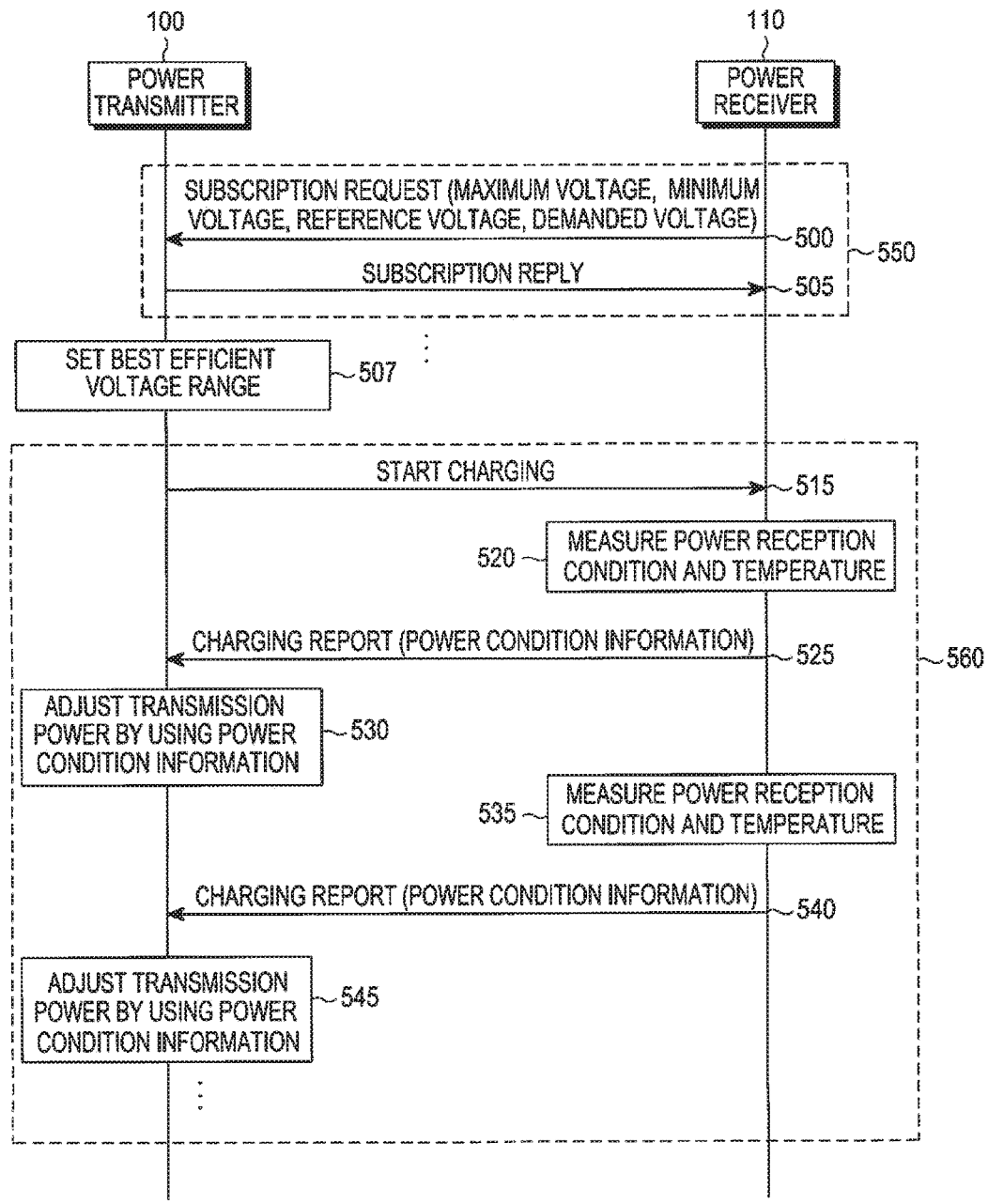
FIG. 5 is a diagram illustrating signal transmission and reception between the power transmitter and the power receiver, according to an embodiment of the present invention.

FIG. 5 is a diagram illustrating a case in which information including the minimum and maximum voltages are contained in the subscription request frame received by the power transmitter 100. However, the information including the minimum and maximum voltages may be contained in a report frame transmitted by the power receiver 100 to notify the power transmitter 100 of the power reception condition, after the power receiver 110 subscribes to the wireless power network controlled by the power transmitter 100. Alternatively, the foregoing information may be contained in a response message to be transmitted by the power receiver 110 in response to the information request from the power transmitter 100, or may be contained in an acknowledgment frame in response to a subscription response frame indicating that the subscription of the power receiver 110 to the wireless power network has been completed.

Accordingly, the power transmitter 100 performs power transmission by determining the range having power reception efficiencies greater than the certain efficiency, the magnitude of a varying voltage, the number of steps, etc., based on the information notified by the power receiver 110, and sending a notice frame to inform the power receiver 110 that it operates in a level-up mode.

The power receiver 110 may periodically measure voltages after receiving the notice frame. The power receiver 110 may change the reference voltage V_high and the demanded voltage V_opt based on the information about the measured voltage/current and/or the measured temperature.

As such, the power receiver 110 informs the power transmitter 100 of the minimum and maximum voltages receivable at the power receiver 110, the reference voltage to be used as a reference for determining the range having a good charging efficiency, and the demanded voltage required by the power receiver 110, by sending the power transmitter 100 the subscription request frame in the registration phase. The power transmitter 100 then determines the power to be transmitted to the power receiver 110 and starts the power transmission. The power reception condition is reported from the power receiver 110 according to the power reception. With the report, the power transmitter 100 may know how to adjust the power to be transmitted to the power receiver 110. The power reception condition may include a new reference voltage V_high determined by the power receiver 110 according to its charging condition. The charging condition may be checked by measuring voltage, current, temperature, etc., at the power receiver 110. The reference voltage V_high may be used for the power transmitter 100 to adjust the best efficient voltage range for the power receiver 110. Specifically, the power transmitter 100 may adjust the best efficient voltage range according to a condition of the power receiver 110.

Additionally, the power receiver 100 may contain the demanded voltage V_opt as well as the reference voltage V_high in the power reception condition. The demanded voltage V_opt is not actually used for the power transmitter 100 to determine the transmission power, but is considered if there is a plurality of power receivers and the amount of power consumption in every power receiver is the same. Thus, the power transmitter 100 may select any of the plurality of power receivers and control the power transmission to fit for the demanded voltage V_opt of the selected power receiver.

Figure 3:
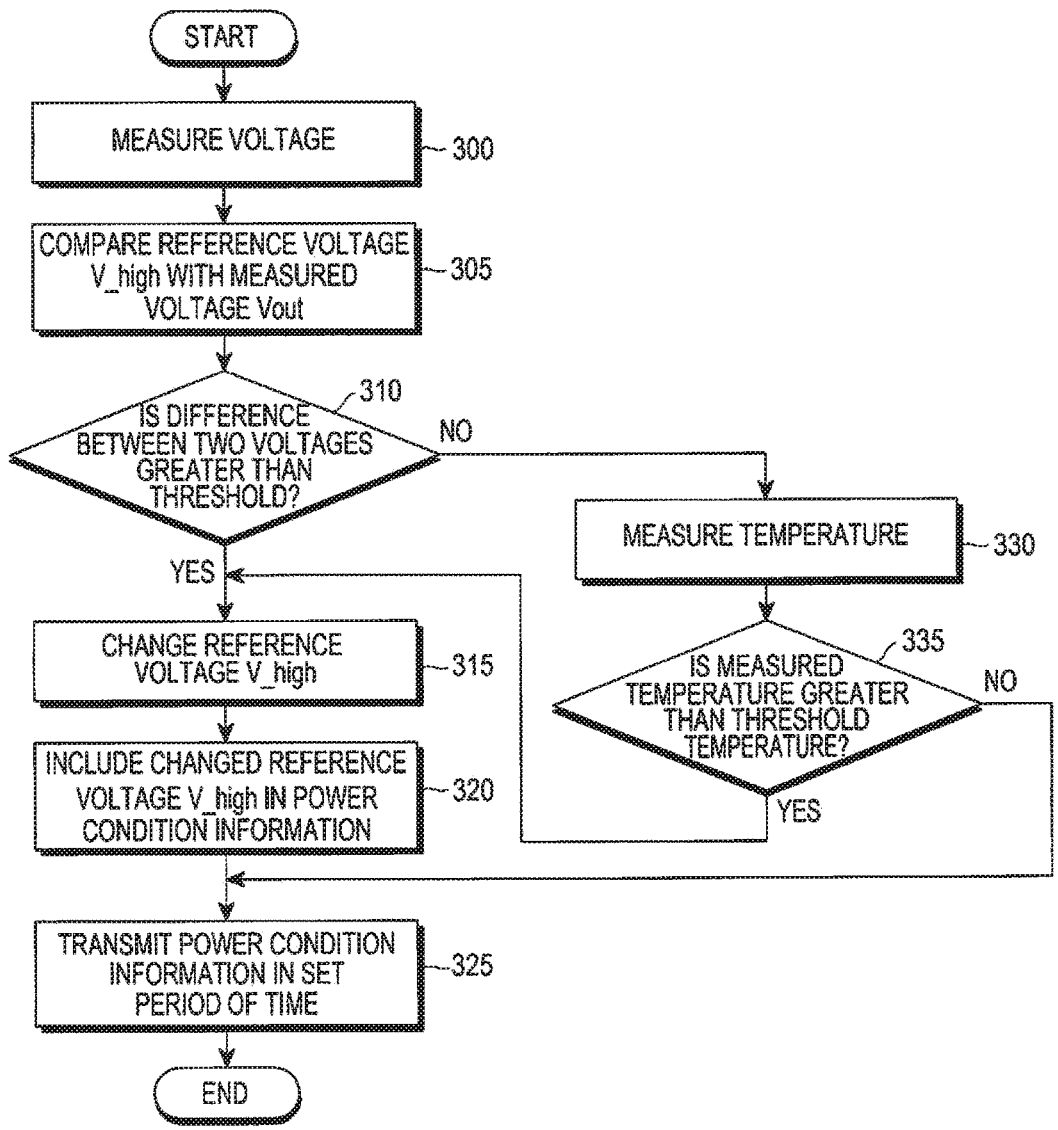
FIG. 3 is a flowchart illustrating a reference voltage establishment methodology in the power receiver, according to an embodiment of the present invention.

FIG. 3 is a flowchart illustrating a procedure for changing the reference voltage V_high according to the information about the measured voltage/current and/or the measured temperature, according to an embodiment of the present invention.

Referring to FIG. 3, the power receiver 110 measures a voltage, in step 300. The power receiver 110 compares the reference voltage V_high, informed by the power transmitter 100, with the measured voltage Vout, in step 305. In step 310, it is determined whether a difference between the reference voltage V_high and the measured voltage Vout is greater than a threshold. When the difference between the two voltages is greater than a threshold, the power receiver 110 changes the reference voltage V_high, in step 315. The power receiver 110 includes the changed reference voltage V_high in the power condition information, in step 320. The power receiver 110 transmits the power condition information to the power transmitter 100 in a set transmission period, in step 325. For this transmission of the power condition information, the report frame may be used.

When the difference between the two voltages is not greater than the threshold in step 310, the reference voltage V_high may still be changed. In an embodiment of the present invention, the fact that an amount of power demanded by the power receiver 110 varies according to, e.g., a difference in temperature is taken into consideration. Thus, if, in step 310, the difference between the two voltages is not greater than the threshold, the power receiver 110 measures a temperature, in step 330. In step 335, the power receiver 110 determines whether the temperature is greater than a threshold temperature for a certain period of time, in step 335. For example, if the reference voltage is 7 V and the temperature increases 5 degrees for 1 minute, it is desirable for the reference voltage V_high to be decreased due to concerns about overheating. If the temperature is kept greater than the threshold temperature for a certain period of time, the reference voltage V_high is changed, in step 315. If the temperature is not greater than the threshold temperature, the power receiver 110 sends the power condition information in the set transmission period, in step 325.

Figure 4:
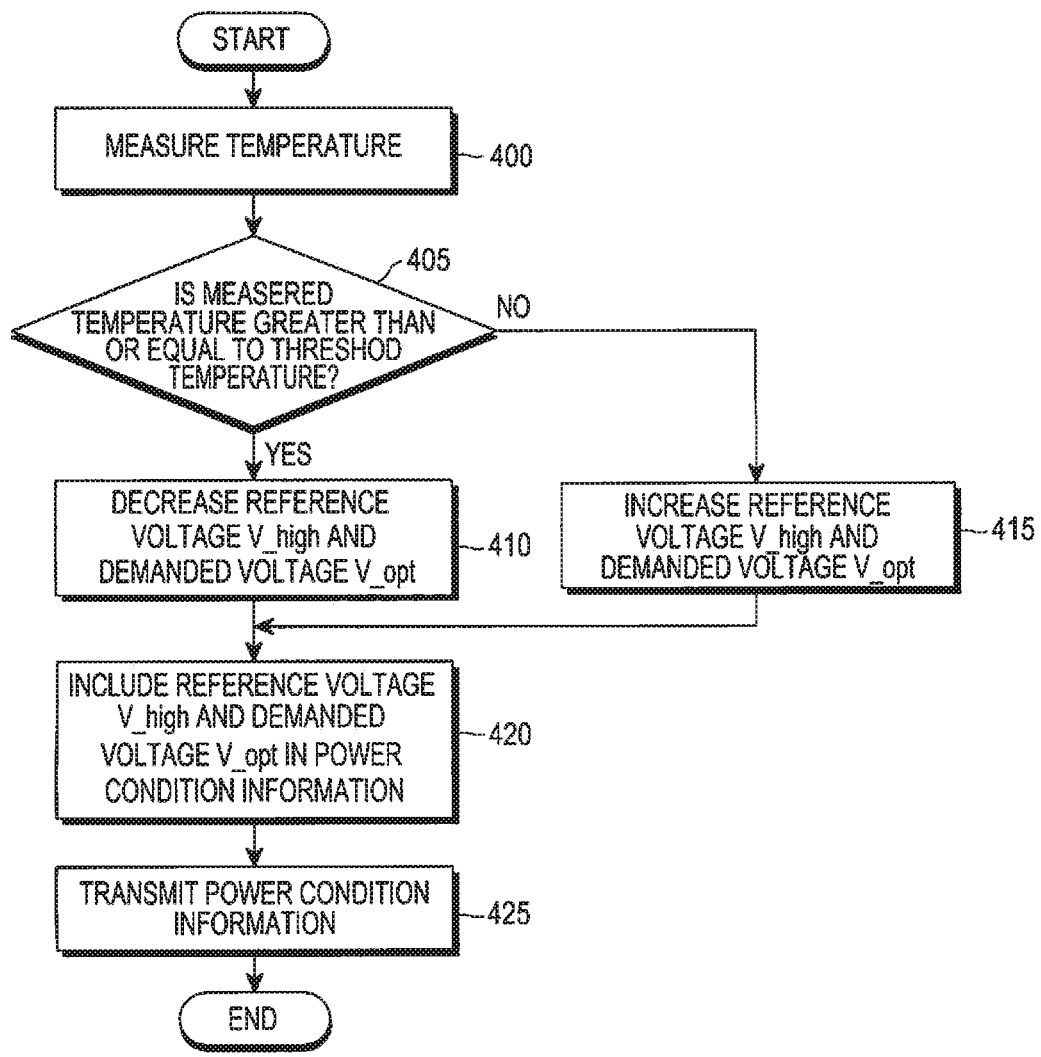
FIG. 4 is a flowchart illustrating a reference voltage and demanded voltage establishment methodology in the power receiver, according to another embodiment of the present invention.

FIG. 4 is a flowchart illustrating a procedure of changing the reference voltage V_high and the demanded voltage V_opt according to the measured temperature at the power receiver 110, according to another embodiment of the present invention.

The power receiver 110 measures the temperature, in step 400. The power receiver 110 determines whether the measured temperature is greater than or equal to the threshold temperature, in step 405. If the measured temperature is greater than or equal to the threshold temperature, the power receiver 110 decreases the reference voltage V_high and the demanded voltage V_opt, in step 410. On the contrary, if the measured temperature is less than the threshold temperature, the power receiver 110 increases the reference voltage V_high and the demanded voltage V_opt, in step 415. The extent of the decrease or increase is determined in proportion to a difference between the currently measured temperature and the threshold temperature. For example, if the measured temperature is greater than or equal to the threshold temperature, the power receiver 110 determines that the temperature has increased due to the high transmission power from the power transmitter 100 and thus, decreases the reference voltage V_high, expecting the transmission power to be decreased. Once the reference voltage V_high and the demanded voltage V_opt are determined, the power receiver 110 includes the reference voltage V_high and the demanded voltage V_opt in the power condition information, in step 420, and transmits the power condition information to the power transmitter 100, in step 425. The report frame is used to transmit the power condition information.

By varying the reference voltage V_high according to the condition of the power receiver 110, the power transmitter 100 adjusts the best efficient voltage range to suit the condition of the power receiver 110. Furthermore, when the power receiver 110 suffers from, e.g., heating, it is possible for the power receiver 110 to decrease the charging voltage supplied by the power transmitter 100.

Operational steps between the power transmitter 100 and the power receiver 110, in which the power receiver 110 determines the minimum voltage V_min, the maximum voltage V_max, the reference voltage V_high, and the demanded voltage V_opt and transmits them to the power transmitter 100, are described with reference to FIG. 5.

Referring to FIG. 5, in step 500, the power transmitter 100 receives the subscription request from the power receiver 110. The power transmitter 100 transmits the subscription reply, in step 505, completing a registration phase 550. The subscription request includes an initial reference voltage V_high and an initial demanded voltage V_opt, as well as the maximum voltage V_max and the minimum voltage V_min determined by the power receiver 110. The initial reference voltage V_high and the initial demanded voltage V_opt are determined in advance by the power receiver 110 by considering its charging capacity, the dimension of its resonator, etc.

Thus, the power transmitter 100 may determine the best efficient voltage range by using the initial reference voltage V_high, in step 507. Specifically, by knowing the initial reference voltage V_high, the power transmitter 100 may determine not only the efficient voltage range 220 between the minimum voltage V_min and the reference voltage V_high, but also the over voltage range 200, the high voltage range 210 between the maximum voltage V_max and the reference voltage V_high, and the under voltage range 230.

Accordingly, the power transmitter 100 may know of the range having good charging efficiencies for the power receiver 110 based on the reference voltage V_high, and know of an optimum input voltage required by the power receiver 110 based on the demanded voltage V_opt. The reference voltage V_high is used by the power transmitter 100 to determine the best efficient voltage range, and the power transmitter 100 adjusts the transmission power to be increased or decreased by determining which range the voltage measured at the power receiver 110 receiving the transmission power belongs to while charging the power receiver 110. Thus, the reference voltage V_high is used by the power transmitter 100 to control the direct power transmission. However, the demanded voltage V_opt is only used to determine how much voltage is demanded by the power receiver 110. If there is a plurality of power receivers in the charging area, the power transmitter 100 controls the power transmission so as not to deteriorate the transmission efficiency for each power receiver 110, rather than simultaneously transmit respective power that corresponds to respective demanded voltages V_opt to all of the power receivers. However, if amounts of power consumption at the plurality of power receivers 100 are the same, the power transmitter 100 controls the power transmission to suit the demanded voltage V_opt of one of the plurality of power receivers.

After transmission of the subscription reply and setting the efficient voltage range, the power transmitter 100 transmits a start charging command, in step 515, when the power transmitter 100 has enough power to charge the standby power receiver 110. By sending the start charging command, a charging phase 560 begins. At the same time the start charging command is sent, the power transmitter 100 supplies the transmission power. As the charging begins, the power receiver 110 measures its power reception condition and temperature, in step 520, and transmits a charging report that includes the power condition information, in step 525. The power transmitter 100 adjusts the transmission power by using the power condition information, in step 530.

Specifically, the power transmitter 100 determines if a measured voltage included in the power condition information belongs to the best efficient voltage range. If the measured voltage is out of the best efficient voltage range but belongs to the over reference voltage range, the power transmitter 100 reduces the transmission power. If the measured voltage belongs to the over maximum voltage range, the power transmitter 100 stops transmitting power by cutting off the transmission power. If the measured voltage belongs to the under minimum voltage range, the power transmitter 100 increases the transmission power. Also, during the charging in the charging phase 560, the power receiver 110 measures the power reception condition and the temperature, in step 535, and periodically/non-periodically transmits the charging report including the power condition information, in step 540.

The report frame is used to transmit the charging report. For example, the report frame may include not only the information about the output voltage Vout, the output current Iout, and the input voltage Vin, but also the temperature information, information about the reference voltage V_high, the demanded voltage V_opt, and Power Control Preference (PCP), as the power condition information. The PCP refers to a power control method required of the power transmitter 100 by the power receiver 110. The PCP includes a method of matching the transmission power from the power transmitter 100 to a power receiver having the highest current reception power, or a method of increasing the entire efficiency, in determining the transmission power at the power transmitter 100. Such power control methods are described in greater detail below with reference to FIG. 6.

Meanwhile, upon reception of the report frame, the power transmitter 100 adjusts the best efficient voltage range by using the new reference voltage V_high included in the received report frame. As the best efficient voltage range is adjusted, the over reference voltage range is changed accordingly. Subsequently, in step 545, the power transmitter 100 adjusts the transmission power by using the power condition information of the report frame. Specifically, as in step 530, the power transmitter 100 adjusts the transmission power by, e.g., decreasing or increasing the transmission power according to the range the measured voltage belongs to. In this manner, the power transmitter 100 may catch the power condition of the power receiver 110 based on the charging report delivered during the charging, and may adaptively adjust the transmission power by reflecting the charging condition of the power receiver 110.

A plurality of power receivers may be disposed in a charging area of the single power transmitter 100. Furthermore, if a voltage measured by each power receiver belongs to the best efficient voltage range of the each power receiver, the power transmitter 100 has to determine which power receiver or what reference voltage should be used as a base to adjust the transmission power. The reference voltage V_high was already used to determine the best efficient voltage range, so in this case, a demanded voltage V_opt of each power receiver may be used.

A method of setting the reference is defined as the power control method, including the PCP such as, for example, a method of suiting a power receiver having the highest current reception power, a method of increasing the entire efficiency, etc. In addition to the foregoing power control methods, the power transmitter 100 tracks the power to control the transmission power as described below.

There is a method of suiting a power receiver having the highest current reception power among the plurality of power receivers. In this method, the power transmitter 100 may track the power to maximize the efficiency of a power receiver having the highest power consumption from among the power receivers. For example, if measured voltages included in the charging reports sent by a first power receiver and a second power receiver fall under the best efficient voltage range known to the power transmitter 100, the power transmitter 100 calculates respective current reception power by using the respective output voltages Vout and the output currents Iout included in charging report. Specifically, charged power in the power receiver may be calculated by multiplying the output voltage Vout and the output current Iout included in the charging report, and accordingly, the power transmitter 100 may know which power receiver is currently consuming the highest power out of the transmission power supplied by the power transmitter 100, and may control the transmission power to suit the power receiver consuming the highest power.

When the output voltage Vout and the output current Iout informed by the first power receiver in the registration phase are 5 V and 20 mA, respectively, the power transmitter 100 may calculate the highest chargeable capacity, i.e., the highest reception power P to be 100 W. Furthermore, when the output voltage Vout and the output current Iout informed by the second power receiver in the registration phase are 5 V and 10 mA, respectively, the power transmitter 100 may calculate the highest chargeable capacity, i.e., the highest reception power P to be 50 W. After these initial calculations, when the output voltage Vout and the output current Iout included in the power reception condition within the charging report sent by the first power receiver are 5 V and 12 mA, respectively, the current reception power P may be 60 W, and when the output voltage Vout and the output current Iout included in the power reception condition of the second power receiver are 5 V and 10 mA, respectively, the current reception power P may be 50 W. Thus, the power transmitter 100 may be aware that the first power receiver has 100 W of maximum chargeable capacity but actually has consumed only 60 W, while the second power receiver has 50 W of maximum chargeable capacity but actually has consumed 50 W.

The power transmitter 100 adjusts the transmission power to suit the first power receiver having more power consumption, i.e., having the higher current reception power. Specifically, the power transmitter 100 selects the first power receiver that is currently consuming the highest power, and determines a transmission power to match the demanded voltage V_opt to the input voltage Vin of the selected first power receiver. For example, the power transmitter 100 compares the demanded voltage V_opt and the input voltage Vin of the first power receiver. If the demanded voltage V_opt is greater than the input voltage Vin, the power transmitter 100 increases the transmission power. If the demanded voltage V_opt is less than the input voltage Vin, the transmission power is decreased. Alternatively, the power transmitter 100 may check the PCP of the selected first power receiver, and may determine the transmission power in a way defined by the checked power control method. The transmission power may be determined depending on whether the PCP of the first power receiver is the method of suiting the power receiver having the highest current reception power, or the method of increasing the entire efficiency.

There is another method to increasing the entire efficiency, according to which the power transmitter 100 may track the power to maximize the efficiency of the entire power transmission system, i.e., the efficiency of the power transmitter 100 and the power receivers, after receiving information about the demanded voltage V_opt from the plurality of power receivers. For example, assuming the current reception power P of the first power receiver is 60 W, calculated based on information contained in the power reception condition in the charging report of the first power receiver, and the current reception power P of the second power receiver is 50 W, calculated based on information contained in the power reception condition in the charging report of the second power receiver, the entire efficiency may be obtained in accordance with Equation (2) below.

Entire Efficiency (%)=(Power of First Power Receiver ($Prx1$)+Power of Second Power Receiver($Prx2$))/Power of Power Transmitter ($Ptx$)  (2)

The power transmitter 100 may determine the transmission power according to the highest entire efficiency among entire efficiencies repeatedly calculated by the equation (2). For example, if the previous entire efficiency is higher than the current entire efficiency, the power transmitter 100 maintains the transmission power determined at the previous efficiency. If the previous entire efficiency is lower than the current entire efficiency, the power transmitter 100 may adjust the transmission power.

The power transmitter 100 may track the power to suit the power receiver having highest power usage rate. The power usage rate refers to a ratio of the demanded power to the reception power. Specifically, the power transmitter 100 may select a power receiver having the highest ratio of current power to maximum reception power from among the plurality of power receivers, and then track the power in a power control method included in the PCP received from the selected power receiver. Alternatively, the power transmitter 100 may control the transmission power to match the demanded voltage V_opt of the selected power receiver to the input voltage Vin reported from the selected power receiver.

For example, assuming the first power receiver has 100 W of the maximum chargeable capacity, i.e., the maximum reception power, and actually consumed only 60 W resulting in 60 W/100 W=60% of the power usage rate, while the second power receiver has 50 W of the maximum chargeable capacity and actually consumed 50 W, resulting in 50 W/50 W=100% of the power usage rate, the power transmitter 100 tracks the power to suit the second power receiver having the higher power usage rate. Specifically, the power transmitter 100 determines the transmission power to match the desired voltage V_opt of the second power receiver to the input voltage Vin reported by the second power receiver. Alternatively, the power transmitter 100 may refer to the PCP of the second power receiver and perform the power control in a method defined by the PCP. Adjustment of the transmission power to suit the second power receiver having better reception ratio compared to the first power receiver also leads to a change in the measured voltage of the first power receiver.

Figure 6:
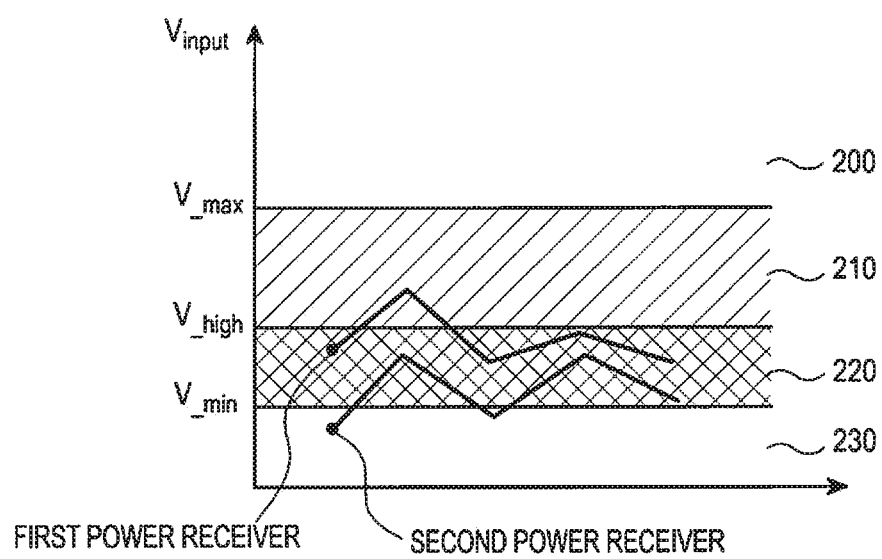
FIG. 6 is a graph illustrating power control methods, according to an embodiment of the present invention.

Referring to FIG. 6, when adjusting the transmission power with respect to the second power receiver and increasing the transmission power to the second power receiver, the voltage measured at the first power receiver also increases accordingly. For example, as in FIG. 6, if the transmission power is increased because the measured voltage at the second power receiver belongs to the under minimum voltage range 230, the measured voltage at the first power receiver may belong to the over reference voltage range 210. In this case, the transmission power may be determined to increase power reception efficiencies of the first and second power receivers, e.g., with the adjustment of increasing or decreasing the transmission power based on the charging report received during the charging.

The power transmitter 100 may track the power to suit the power receiver having the highest reception power among the plurality of power receivers. For example, in the case of the second power receiver, the maximum reception power is calculated by the power transmitter 100 to be 10 W, 5 W higher than the maximum reception power of the first power receiver. Thus, the transmission power may be adjusted to suit the second power receiver. Accordingly, the transmission power may be determined to match the demanded voltage V_opt of the second power receiver to the input voltage Vin reported by the second power receiver, or the PCP of the second power receiver is referred to and the power control may be performed in a method defined by the PCP.

If there are two or more power receivers having the same power usage rates, the power transmitter 100 may select one having a higher current reception power, and track the power to suit the selected power receiver. For example, if the second power receiver is selected, the transmission power may be determined to match the demanded voltage V_opt of the second power receiver to the input voltage Vin reported by the second power receiver, or the transmission power may be determined according to a power transmission control method included in the PCP of the second power receiver.

As described above, if each power receiver provides the maximum voltage, the minimum voltage, the reference voltage, and the demanded voltage in the registration phase, the power transmitter 100 has to determine which power receiver or what reference should be used as a base to control the transmission power. Embodiments of the present invention propose using the above-described methods.

Accordingly, the power transmitter 10 adjusts the transmission power according to the basis to which all of conditions, such as, for example, the power usage rate, the current reception power, the maximum reception power, and the entire efficiency, are applied. When controlling the power based on the efficiency, the power transmitter 100 increases (or decreases) the transmission power and calculates the efficiency by using information included in the power reception condition received from the power receiver. If the efficiency gets better, compared to the efficiency in the step prior to changing the transmission power, the power transmitter 100 may keep the transmission power the same or increase (or decrease) the transmission power. If the efficiency gets worse again in this procedure, the power transmitter 100 may keep the changed transmission power the same or decreases (or increases) the transmission power. Alternatively, the power transmitter 100 controls the transmission power by selecting one of a plurality of power receivers based on any of the power usage rate, the current reception power, and the maximum reception power, comparing the demanded voltage and the input voltage of the selected power receiver, increasing the transmission power if the demanded voltage is larger than the input voltage, and decreasing the transmission power if the demanded voltage is less than the input voltage.

Figure 7:
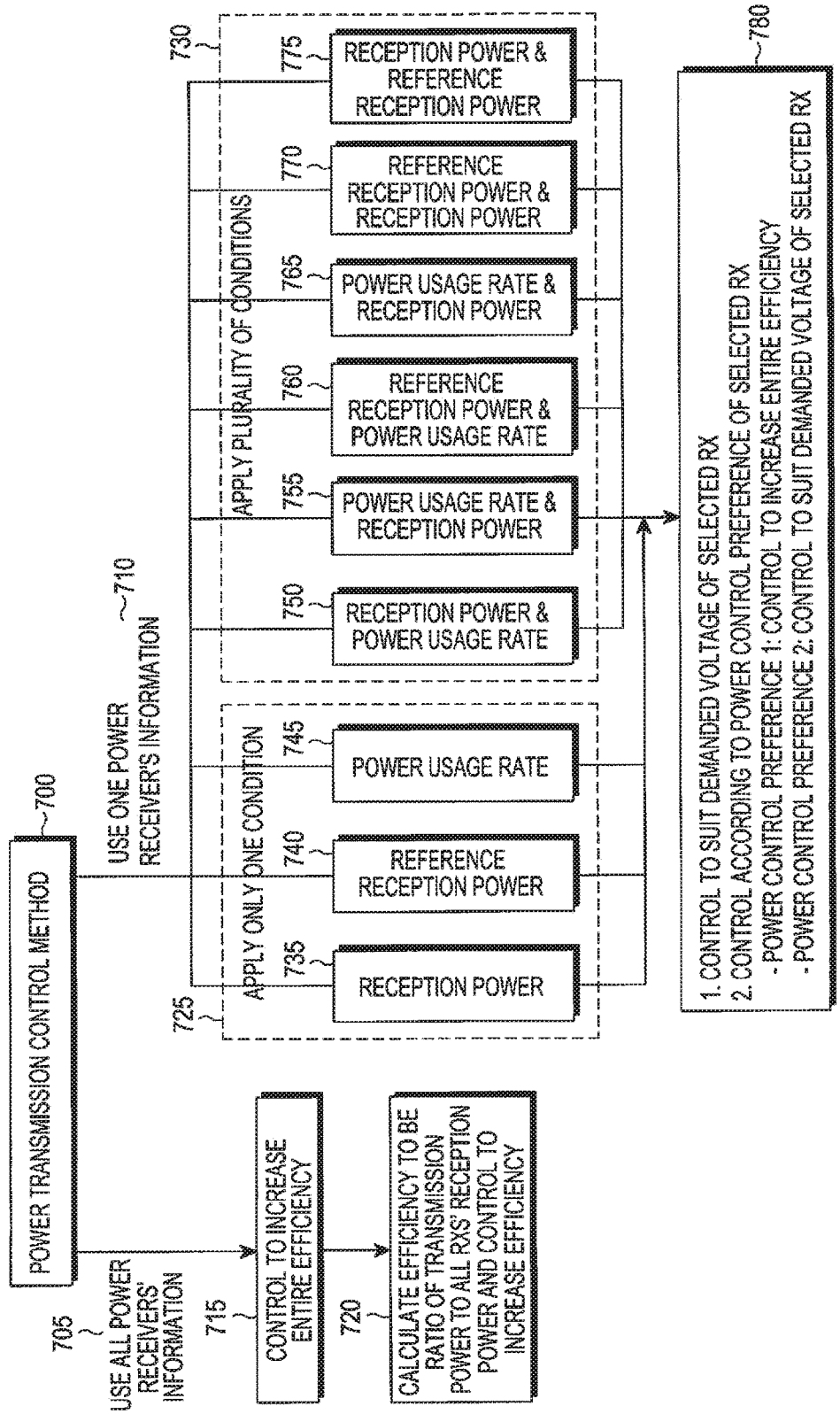
FIG. 7 is a diagram illustrating a method of classifying power control methods, according to an embodiment of the present invention.

The foregoing procedure is described in greater detail below with reference to FIG. 7. FIG. 7 is a diagram illustrating a method of classifying power control methods, according to an embodiment of the present invention.

The power transmission control methods are largely classified into two groups based on the number of power receivers used in the power control. In one of the two cases that a single power receiver is selected, it may further be classified based on whether to apply any one of conditions of reception power, reference reception power and power usage rate, or to apply two or more of these conditions.

Specifically, the power transmitter 100 performs power transmission to each power receiver after receiving from at least one power receiver the minimum and maximum voltages receivable at the power receiver, the reference voltage used to divide the range between the minimum and maximum voltages into predetermined portions, and the demanded voltage required by the power receiver. In return, the power transmitter 100 receives from each power receiver a report of the power reception condition that includes a measured voltage at the power receiver. The power transmitter 100 determines which of the divided portions (or ranges) the measured voltage included in the report belongs to whenever receiving the report. The reference voltage may be changed according to, e.g., a temperature, and thus the reference voltage included in the report about the power reception condition may also be changed. Voltage ranges of the power receiver may also be changed. Thus, the power transmitter 100 determines which of the voltage ranges, of each power receiver sending the report, the measured voltage included in the report belongs to.

All of the plurality of power receivers may have their measured voltages belonging to their optimum voltage ranges, respectively. In this case, the power transmitter 100 has to determine what reference should be applied to track the power, i.e., which power transmission control method should be applied.

Referring to FIG. 7, a power transmission control method 700 may be largely classified into two groups: a method 705 of using information of the plurality of power receivers, and a method 710 of using information of one power receiver selected from among the plurality of power receivers.

When selecting the method 705, using the information of the plurality of power receivers, the power transmitter 100 increases the entire efficiency, in step 715. The efficiency is increased after calculating the efficiency to be the ratio of the transmission power to the reception power of all the power receivers as in Equation (2), in step 720.

When selecting the method 710, using the information of one selected power receiver, the method 710 may be classified into a case 725 of applying a single condition and a case 730 of applying a plurality of conditions. The conditions may include the reception power, the reference reception power, and the power usage ratio.

For example, when the plurality of power receivers report their measured voltages belonging to best efficient voltage regions, the power transmitter 100 may select any of a power receiver having the highest reception power 735, a power receiver having the highest reference reception power 740, and a power receiver having the highest power usage rate 745 among the plurality of receivers. Similarly, in the case of applying the plurality of conditions, the power transmitter 100 may select a power receiver having higher reception power and power usage rate 750. In this manner, the power transmitter 100 may select any of the power usage rate and reception power 755, the reference reception power and power usage rate 760, the power usage rate and reference reception power 765, the reference reception power and reception power 770, and the reception power and reference reception power 775.

When any power receiver is selected under the foregoing condition, the power transmitter 100 performs the power transmission control, i.e., power adjustment to suit the demanded voltage of the selected power receiver, or performs the power transmission control according to the established PCP of the selected power receiver. The PCP is a power control method requested of the power transmitter 100 by the selected power receiver, and for this, either a method of adjusting the power to suit the demanded voltage of the selected power receiver, or a method of increasing the entire efficiency for the plurality of power receivers may be set up, in step 780.

According to the present invention, the demanded power may be determined and notified to the power transmitter 100 by taking into account various charging conditions, such as, for example, the power receiver's characteristics, the charging condition, and the difference in temperature, thereby allowing for the power transmitter to control the efficient power transmission. Furthermore, by enabling the power receiver and the power transmitter to check each other via wireless communication, incorrect power transmission may be prevented and reliability of the multiple power transmission system may be secured.

While the invention has been shown and described with reference to certain embodiments thereof, it will be understood by those skilled in the art that various changes in form and detail may be made therein without departing from the spirit and scope of the present invention as defined by the following claims.

What is claimed is:

1. A method of controlling power transmission in a power transmitter, the method comprising:
   receiving, from at least one power receiver, a first message including a first voltage and a second voltage that is greater than the first voltage;
   transmitting power to the at least one power receiver;
   receiving, from the at least one power receiver, a second message including a third voltage measured at the at least one power receiver while transmitting the power; and
   adjusting an amount of the power based on whether the third voltage is between the first voltage and the second voltage,
   wherein the first voltage is a minimum voltage for the at least one power receiver.

2. The method of claim 1, wherein adjusting the amount of the power comprises:
   decreasing the amount of the power, if the third voltage is greater than the second voltage, and increasing the amount of the power, if the third voltage is lower than the first voltage.

3. The method of claim 1, further comprising stopping transmitting the power, if the third voltage is greater than a predetermined value.

4. The method of claim 1, wherein the second voltage is a reference voltage for determining a voltage region having a charging efficiency greater than a threshold value.

5. The method of claim 1, wherein, when the at least one power receiver comprises a plurality of power receivers, further comprising adjusting the amount of the power to increase an entire efficiency for the plurality of power receivers, if the third voltage at each of the plurality of power receivers is between the first voltage and the second voltage.

6. The method of claim 1, wherein the second message includes at least one of a voltage at a charger of the at least one power receiver, a voltage measured at a rectifier output of the at least one power receiver, and a current measured at the at least one power receiver during power reception, a changed reference voltage, and a measured temperature.

7. A power transmitter for controlling power transmission, the power transmitter comprising:
   a resonator;
   a power supply;
   a wireless communication unit configured to receive, from at least one power receiver, a first message including a first voltage and a second voltage that is greater than the first voltage, and receive, from the at least one power receiver, a second message including a third voltage measured at the at least one power receiver while transmitting the power; and
   a controller configured to control the power supply to:
      transmit the power to the at least one power receiver through the resonator; and
      adjust an amount of the power based on whether the third voltage is between the first voltage and the second voltage, wherein the first voltage is a minimum voltage for the at least one power receiver.

8. The power transmitter of claim 7, wherein the second voltage is a reference voltage for determining a voltage region having a charging efficiency greater than a threshold value.

9. The power transmitter of claim 7, wherein the controller is further configured to adjust the amount of the power to increase an entire efficiency for a plurality of power receivers if the third voltage at each of the plurality of power receivers is between the first voltage and the second voltage.

10. The power transmitter of claim 7, wherein the controller is further configured to decrease the amount of the power, if the third voltage is greater than the second voltage, and to increase the amount of the power, if the third voltage is lower than the first voltage.

11. The power transmitter of claim 7, wherein the controller is further configured to stop transmitting the power, if the third voltage is greater than a predetermined value.

12. The power transmitter of claim 7, wherein the second message includes at least one of a voltage at a charger of the at least one power receiver, a voltage measured at a rectifier output of the at least one power receiver, and a current measured at the at least one power receiver during power reception, a changed reference voltage, a changed demanded voltage, and a measured temperature.

* * * * *